April 26, 1949.

J. C. DERKSEN 2,468,430

CASING WITH PUSHBUTTON VALVE
FOR AIR DEPOLARIZED CELLS
Filed July 2, 1946

INVENTOR
JAN CORNELIS DERKSEN

BY
ATTORNEY

Patented Apr. 26, 1949

2,468,430

UNITED STATES PATENT OFFICE 2,468,430

CASING WITH PUSHBUTTON VALVE FOR AIR DEPOLARIZED CELLS

Jan Cornelis Derksen, Eindhoven, Netherlands, assignor to Hartford National Bank and Trust Company, Hartford, Conn., as trustee Application July 2, 1946, Serial No. 680,920
In the Netherlands April 12, 1943

Section 1, Public Law 690, August 8, 1946
Patent expires April 12, 1963

3 Claims. (Cl. 136—173)

This invention relates to a dry electric element with depolarization by oxygen of the air and to a battery consisting of such elements. In an element of this kind the depolarization entirely or partly takes place by oxygen of the air which is contained in the depolarization-mass usually containing an active carbon and which, as it is consumed due to the output of electricity, is replenished from the air surrounding the element. For an adequate replenishment of oxygen steps are often taken which permit an easier penetration of the surrounding oxygen of the air to the depolarization-mass.

The present invention has for its object to increase the yield of electric energy of a so-called dry element with depolarization by oxygen of the air. It is based on the realization that water vapor is capable of leaving the element along the path which serves to allow the oxygen of the air to penetrate to the depolarization-mass, so that the element dries up with time, and that this drying up is detrimental to the yield of electric energy of the element.

According to the invention, which has for its purpose to counteract this disadvantage, a dry element with depolarization by oxygen of the air is equipped with a controlling mechanism by means of which the inlet of oxygen of the air to the element and the outlet of water vapor can be entirely or partly interrupted.

An element according to the invention has the advantage that during the periods in which it has not to deliver current, it is entirely or partly shut off from the surrounding oxygen of the air and drying up due to loss of water along paths designed for the supply of oxygen of the air can be counteracted. By shutting off the oxygen of the air during the currentless periods the spontaneous discharge can be acted upon with advantage.

Another advantage consists in that an element, before being put into service for the first time, can be so conserved as to be shut off from oxygen of the air and water-vapor, so that there is less risk of drying up and spontaneous discharge, which is advantageous in regard to the time for which an element can be stored after its manufacture, so-called "shelf-life," without its yield of energy being adversely affected too gravely.

It may be pointed out that it is required for a satisfactory operation of an element according to the invention that practically no loss of water can take place along paths other than those designed for the supply of oxygen of the air. This can be ensured by taking care that the moisture-containing parts of an element at points other than those designed for the supply of oxygen of the air are surrounded by an envelope which is practically not permeable to water-vapor. When making use of a metal electrode in the form of a cup, the cup partly serves as a moisture-tight envelope, and for further sealing of the top of the cup use may be made of a sealing mass, for instance bitumen or wax. In the case of a battery comprising a plurality of elements the elements may be housed in a vapor-tight box, for instance a metal box lined with insulating material, which box, apart from the points for the supply of oxygen of the air, should be free as much as possible from clefts and slits.

In order that the invention may be more clearly understood and readily carried into effect, it will now be described more fully with reference to the accompanying drawing, given by way of example, in which Fig. 1 is a perspective view of a cell or battery provided with a sealing mechanism according to the invention.

Figure 1:
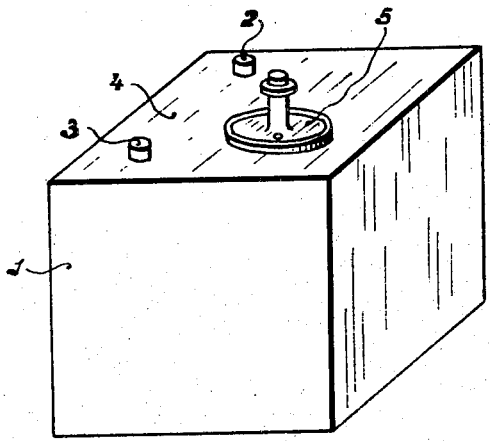
Figure 2:
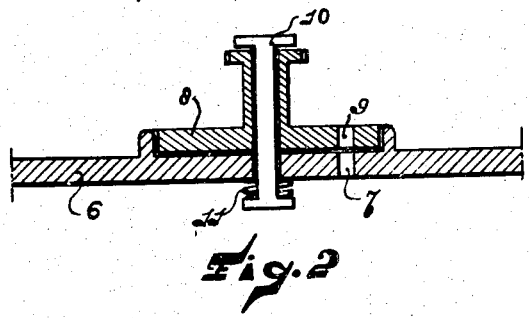
Fig. 2 is a sectional view in elevation of the sealing mechanism of Fig. 1.

Fig. 1 represents diagrammatically a battery having a sealing mechanism. The battery proper is housed in a hermetically closed metal box 1 which is internally coated with an insulating lacquer, for instance shellac, and which comprises junction terminals 2 and 3 that are passed in an air-tight manner through the cover 4 of the box and are connected internally to the terminals of the element. The cover 4 is furnished with an oxygen inlet with sealing mechanism 5, as is represented in section in Fig. 2. In this figure the reference number 6 denotes the wall of the box 1 having an aperture 7 for the supply of oxygen. A disc 8, having a hole 9, is capable of turning about the shaft 10 and is drawn by the draw spring 11 against the wall of the box. When the disc 8 is given such a position that the apertures 7 and 9 are opposite each other oxygen of the air can gain access to the interior of the box and consequently to the battery. The oxygen supply can be interrupted by turning the disc.

According to a particular embodiment of the invention an element is equipped with a mechanism which in the periods during which current is taken from the element, permits the value of the supply of oxygen of the air to be adjusted in accordance with the intensity of the current and the supply of oxygen required therefor. For instance, either the width of the aperture through which oxygen gains access to the depolarization-mass may be altered according to whether the element requires more or less oxygen, or the number of apertures through which the oxygen enters may be modified.

In a particularly suitable embodiment of the invention the mechanism controlling the inlet of oxygen of the air is coupled with a switch or regulator for controlling the electricity output of the element. This embodiment is of special importance for apparatus such as radiosets in which is incorporated an electric element or a battery, for instance an anode-battery. Upon switching on the set the supply of oxygen of the air is automatically admitted at the same time.

Figure 3:
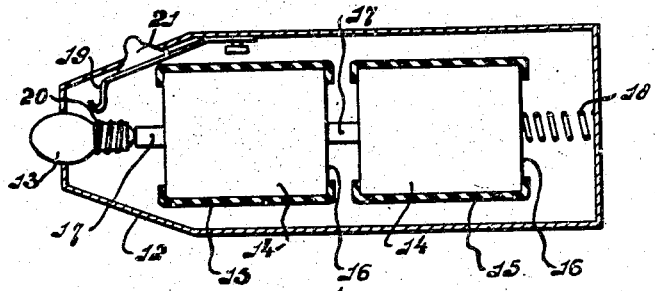
Fig. 3 is a sectional view of a pocket lamp having elements for depolarization of the batteries by oxygen of the air.

Fig. 3 represents diagrammatically a pocket lamp having elements with depolarization by oxygen of the air, in which upon switching on the electric current oxygen is allowed to find its way to the elements. An air-tight metal casing 12 having a lamp 13 hermetically mounted therein comprises two elements 14 which are surrounded by insulating cardboard sleeves 15. The terminals of the elements are constituted by the zinc cups 16 and the carbon rods 17. The spring 18 establishes a satisfactory electrical contact between the elements, the lamp and the wall of the casing. The lamp is lit by means of the elastic strip 19 which can be pushed against the cap 20 of the lamp, thus completing the electric circuit. The strip 19 is furnished with a push-button 21 exactly fitting in a corresponding aperture of the wall of the casing 12 and sealing this practically hermetically in the state of rest of the strip. On pressing the knob 21 for lighting the lamp this seal between the knob and the wall of the casing is interrupted and an annular slit ensues through which the oxygen of the air is capable of gaining access to the interior of the casing and consequently to the elements.

Instead of allowing the oxygen of the air to find its way to the depolarization-mass through apertures the depolarizing oxygen of the air may also be admitted through a nonporous membrane which transmits oxygen of the air to a sufficient degree but water-vapor only to a small degree. This embodiment has the advantage that drying up is avoided as much as possible also during the periods in which the element supplies current and the mechanism is opened for the entrance of oxygen of the air, which is of particular importance in the case of a large current supply which requires a considerable supply of oxygen of the air and ample opportunity of drying up. As a membrane sufficiently permeable to oxygen but little pervious to water-vapor diaphragms are suitable for instance, which contain a liquid hydrophobe medium capable of dissolving oxygen.

In the case of a membrane being made by impregnating paper with such a medium it is advisable that the hydraphobe medium capable of dissolving oxygen should be mixed with a gel-forming material such as nitrocellulose which, after impregnation, passes to the gel-state. Thus the medium, after impregnation, is prevented from leaking away through the pores of the paper.

The size of the surface of a membrane required for a suitable operation of the element, on which the membrane is mounted, is naturally related to the ratio of its permeability to water and oxygen and can be readily established experimentally.

Sometimes the conditions imposed on an element are such that by giving the membrane such a large surface as is permissible in view of drying up of the element, the oxygen of the air consumed during the supply of electricity can be replenished practically immediately through the membrane. In other cases it may occur that the quantity of oxygen of the air transmitted by a membrane per unit of time is smaller than the quantity of oxygen consumed. This need not mean that the membrane is unsuitable since in most cases the oxygen available in the free space of the element and absorbed by the depolarization-mass constitutes a sufficient reserve and during the periods of rest next to the supply of energy provision can be made for an adequate replenishment of oxygen of the air by taking care, for instance, that during the period of rest the supply of oxygen of the air is not entirely interrupted by the control-mechanism. In these cases it is sufficient that the quantity of oxygen transmitted in 24 hours by the membrane replenishes the oxygen consumed in 24 hours. This also holds when the oxygen of the air enters through apertures. The width of the apertures on taking off current from the element may be such that the consumed oxygen of the air is not immediately replenished, provided a sufficient replenishment takes place during the currentless periods.

As has already been pointed out above, the invention applies both to a single element and to a battery. In the last-mentioned case the battery is preferably surrounded by an oxygen-tight and water-vapor-tight envelope having one or more inlets for the supply of oxygen of the air, which give access to one or more spaces freely communicating with depolarization-masses of the battery elements. Thus, for instance, the elements shown in Fig. 1 can be housed in an air-tight box not permeable to water-vapor and having one or more apertures.

The use of such a common space having only one or a few inlets permits the supply of oxygen of the air to the elements to be controlled in a simple manner by means of a cut off mechanism.

What I claim is:

1. Electrical apparatus comprising an electric dry cell subject to depolarizaton by oxygen of the air, an air and water vapor tight envelope enclosing said cell and being provided with an aperture, switching means for connecting said cell in electrical circuit, said switching means cooperating with said aperture to selectively open said aperture and admit oxygen of the air to said cell upon actuation of said switching means.

2. Electric apparatus comprising an electric dry cell subject to depolarization by oxygen of the air, an air and water vapor tight envelope enclosing said cell and being provided with an aperture, and a spring switch assembly for establishing an electrical connection from said cell to an electrical circuit, said spring switch assembly cooperating with said aperture to selectively open said aperture and admit oxygen of the air to said cell upon actuation of said switching assembly.

3. Electric apparatus comprising an electric dry cell subject to depolarization by oxygen of the air, an air and water-tight envelope enclosing said cell and being provided with an aperture, a switch assembly comprising a flexible contact for connecting the cell to an electric circuit and a button secured to said flexible contact and adapted to fit over said aperture when said cell is disconnected from said electric circuit and to open said aperture to provide access to the air for said cell when said cell is connected to said electric circuit.

JAN CORNELIS DERKSEN.

REFERENCES CITED

The following references are of record in the file of this patent:

UNITED STATES PATENTS

| Number | Name | Date |
| --- | --- | --- |
| 441,843 | Hoy | Dec. 2, 1890 |
| 2,120,618 | Martus et al. | June 14, 1938 |